Figure 1:
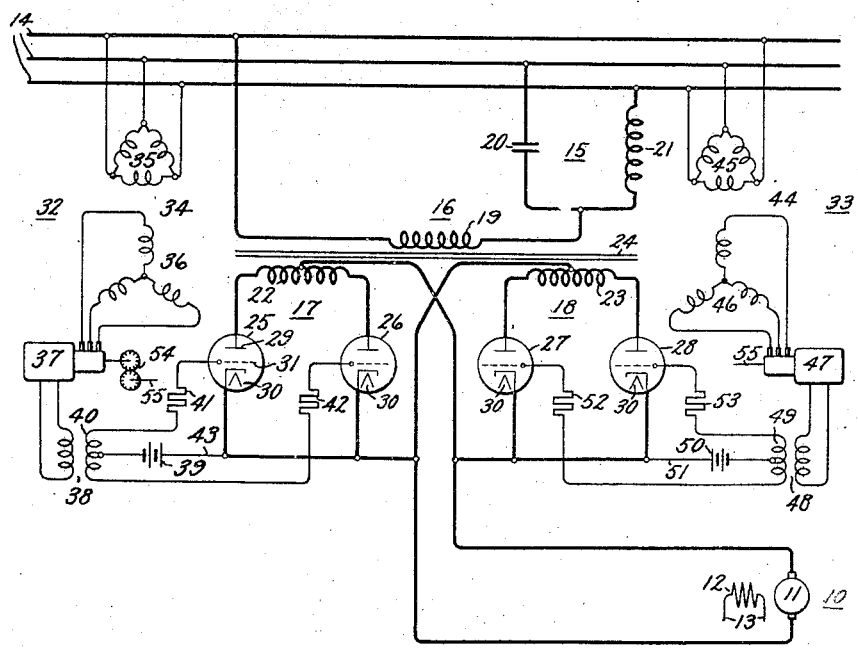

March 17, 1942.  C. H. WILLIS  2,276,752
ELECTRIC CONTROL CIRCUITS
Filed Aug. 25, 1939

Inventor:
Clodius H. Willis,
by Harry E. Dunham
His Attorney.

Patented Mar. 17, 1942

2,276,752

UNITED STATES PATENT OFFICE 2,276,752

ELECTRIC CONTROL CIRCUITS

Clodius H. Willis, Princeton, N. J., assignor to General Electric Company, a corporation of New York Application August 25, 1939, Serial No. 291,915

8 Claims. (Cl. 172—274)

My invention relates to electric control circuits, and more particularly to electric valve translating circuits used in connection with torque amplifiers.

Torque amplification is obtained by controlling an apparatus with a small torque which in turn controls the movement of a much heavier mechanism by controlling its actuating element. Such actuating element may comprise a dynamo-electric machine of the direct current type. In many of the prior art arrangements control of dynamo-electric machines of the direct current type has been effected by energizing them from alternating current circuits through suitable electric valve translating apparatus. Where, as in torque amplifiers, it is desirable to control the dynamo-electric machine by means of the associated electric valve means, this control has been obtained at a sacrifice in the power factor conditions of the load imposed on the alternating current supply circuit. These undesirable power factor conditions, in many instances, have been caused by the use of controlled rectifiers in which the desired voltage control has been obtained by retarding the phase of the potentials impressed upon the control members thereby causing the electric valve translating apparatus to consume large lagging currents from the alternating current supply circuits. It has been evident that it is highly desirable to provide translating apparatus for obtaining the desired flexibilty of control without imposing on the alternating current circuits disproportionately low power factor loads. Such an arrangement has been described and claimed in United States Letters Patent No. 2,081,780, granted May 25, 1937, on an application of Richard Tröger and assigned to the same assignee as the present application. In torque amplifiers of the prior art, current limiting means are generally provided which tend to decrease the power factor in the lagging direction. In my invention the current is limited to a definite maximum value and yet the power factor of the energy drawn from alternating current supply is at least not lagging but rather substantially unity power factor or somewhat leading. Accordingly, I provide a torque amplifier which will not only improve the power factor but which will distribute the load among the phases of the polyphase alternating current supply, reduce the peak load and give an ampere phase displacement characteristic which is substantially linear and independent of the voltage.

It is an object of my invention to provide a new and improved control circuit.

It is another object of my invention to provide a new and improved translating circuit for controlling dynamo-electric machines.

It is a further object of my invention to provide a new and improved torque amplifier wherein a current-limiting means is provided which will not undesirably effect the power factor and which will furnish an ampere phase displacement characteristic which is substantially linear.

It is a still further object of my invention to provide a new and improved electric valve translating circuit for energizing a dynamo-electric machine of the direct current type from an alternating current circuit through electric valve translating apparatus, without imposing on the alternating current circuit a lagging power factor load.

In accordance with the illustrated embodiment of my invention I provide an electric valve translating apparatus for energizing a reversible direct current motor from an alternating current circuit whereby a high degree of flexibility as to the direction of rotation, speed of the motor and control is obtained, and whereby the power factor drawn from the alternating current circuit may be maintained in a leading relationship or at approximately unity power factor within the entire range of operation of the motor. By means of a monocyclic network, a three phase alternating current constant potential source is converted into a single phase constant current alternating potential which is used to energize a pair of reversely or cross-connected biphase rectifiers, the output of which is supplied to a reversible direct current motor. The speed and direction of rotation of the motor is controlled by suitable phase-shifting means for controlling the output of the reversely or cross-connected biphase rectifiers and an ampere phase displacement characteristic is obtained which is substantially linear. The monocyclic network definitely limits the maximum current which may be supplied to the direct current motor. The biphase rectifiers are of the controlled type permitting consumption of lagging current. When a lagging current is drawn from the output circuit of a monocyclic network of this type the current supplied to this network from the constant potential alternating current circuit will tend to be leading.

My invention, both as to its organization and method of operation together with other and further objects thereof, will best be understood by reference to the following description taken in connection with the accompanying drawing, and its scope will be pointed out in the appended claims. In the accompanying drawing Fig. 1 illustrates an embodiment of my invention as applied to the control of a reversible direct current motor, while Fig. 2 represents an operating condition of the apparatus illustrated in Fig. 1.

Figure 2:
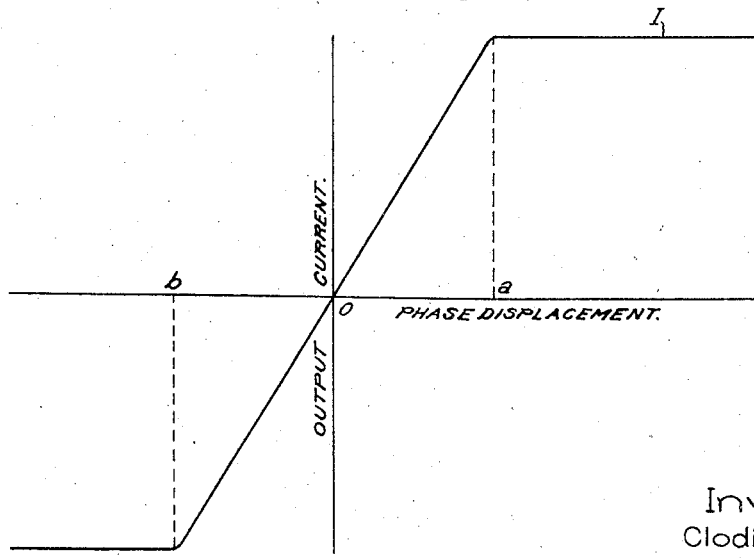

Referring now to Fig. 1 of the accompanying drawing, my invention is diagrammatically shown as applied to an improved electric valve translating circuit for energizing a reversible direct current dynamo-electric machine from a constant potential alternating current circuit. This dynamo-electric machine may be used to drive heavy apparatus and may be particularly useful in connection with the positioning of large apparatus. In Fig. 1, I have illustrated a reversible direct current dynamo-electric machine 10 adapted to drive a suitable load (not shown). Dynamo-electric machine 10 is provided with an armature member 11 and a field winding 12, the latter being energized from any suitable direct current source 13. The armature 11 of dynamo-electric machine 10 is illustrated as being energized from a three-phase constant potential alternating current source 14 through a constant potential constant current transforming means 15, an inductive means comprising a transformer 16 and a pair of reversely or cross-connected biphase rectifiers 17 and 18. The transforming means 15 is illustrated as a resonating network and includes reactances of opposite sign connected so that a constant current is supplied to the primary winding 19 of transformer 16. In the arrangement shown in Fig. 1 I have chosen to represent my invention as transforming three-phase constant potential alternating current to single phase constant current alternating current, and I employ a capacitive reactance 20 and an inductive reactance 21 preferably having equal values of ohmic reactances connected so that these reactances supply a constant current to the primary winding 19 of transformer 16. This network embodying capacitive reactances 20 and inductive reactances 21 will be hereinafter referred to as a monocyclic network 15. The transformer 16 interconnecting the constant current circuit with the electric valve means includes in addition to primary winding 19 a pair of secondary windings 22 and 23 all mounted on a common core 24. The terminals of secondary winding 22, which is associated with biphase rectifier 17, are connected with one of the electrodes of electric discharge valves 25 and 26, while the terminals of secondary winding 23, which is associated with biphase rectifier 18, are connected to one of the electrodes of electric discharge valves 27 and 28. These electric discharge valves 25 to 28 serve to convert the alternating current of constant value to direct current of constant value and are each provided with an anode 29, a cathode 30 and a control electrode 31. Although I have illustrated each biphase rectifier 17 and 18 as comprising a pair of electric discharge valves, each including an anode, a cathode and a control electrode contained within a separate envelope, it will be understood by those skilled in the art that electric discharge valves 25 and 26 may be replaced by a single electric discharge valve having a pair of anodes, a pair of control electrodes and a single cathode. Similarly, electric discharge valves 27 and 28 may be replaced by a single electric discharge valve. Electric discharge valves 25 to 28 may be any of the types well known in the art although I prefer to use valves of the vapor electric type. One terminal of the armature winding 11 of dynamo-electric machine 10 is connected to the midpoint of secondary winding 22 associated with byphase rectifier 17. The cathodes 30 of electric discharge valves 26 and 27 associated with biphase rectifier 17 are connected to the other terminal of armature winding 11. However, the output of biphase rectifier 18 is reversely connected, with respect to biphase rectifier 17, to the armature member 11 of dynamo-electric machine 10 in that the midpoint of secondary winding 23 is connected to the terminal of armature winding 11 to which the cathodes 30 of electric discharge valves 26 and 27 associated with biphase rectifier 17 are connected, and the cathodes 30 of electric discharge valves 27 and 28 associated with biphase rectifier 18 are connected to the same terminal of armature 11 to which the midpoint of secondary winding 22 associated with biphase rectifier 17 is connected.

To control the operation of dynamo-electric machine 10 I provide a control circuit 32 for biphase rectifier 17 and another control circuit 33 for biphase rectifier 18. The control circuit 32 may be energized from any suitable source of alternating potential and in the accompanying drawing is shown as energized from the constant potential alternating current circuit 14 through a transformer 34 having a primary winding 35 and a secondary winding 36 and through any conventional phase-shifting device such as a rotary phase shifter 37 and a transformer 38. A suitable biasing means such as battery 39 serves to impress a negative biasing potential upon the control members 31 of electric discharge valves 25 and 26. The secondary winding 40 of transformer 38 is connected to the control electrodes or grids 31 of electric discharge valves 25 and 26 through current-limiting resistances 41 and 42. A conductor 43 connects the battery 39 to the cathode 30 of electric discharge valves 25 and 26. Similarly, control circuit 23 for biphase rectifier 18 comprises a transformer 44 having a primary winding 45 connected to the constant potential source 14 and a secondary winding 46 serving to energize a suitable phase shifter 47. A transformer 48 transmits control potentials by virtue of its secondary winding 49 to the control electrodes 31 of electric discharge valves 27 and 28. A negative bias battery 50 serves to impress a negative potential upon control electrodes 31 of electric discharge valves 27 and 28. This battery is connected by conductor 51 to the cathodes 30 of electric discharge valves 27 and 28. Suitable current limiting resistances 52 and 53 are connected in the grid-to-cathode circuit of electric discharge valves 27 and 28. The rotary phase shifters 37 and 47 are mechanically interlocked through gearing 54 and shaft 55 so as to be rotated simultaneously in opposite directions, as will be described in greater detail hereinafter.

While in the drawing I have described my invention as applied to a three-phase alternating current supply, it should be understood that my invention may equally well be applied to single-phase or polyphase alternating current systems.

The general principles of operation of the embodiment of my invention diagrammatically illustrated in Fig. 1 may best be explained when considering different operating conditions of the apparatus. Since the primary winding 19 of transformer 16 is connected in the constant current circuit a constant current will always flow therethrough regardless of the other conditions of the circuit. In the operating condition for example, when phase shifters 37 and 47 are so adjusted that the grid potentials are fully advanced with respect to the anode potentials of the biphase rectifiers the direct current output of biphase rectifiers 17 and 18 will be equal but have opposite polarities so as to neutralize one another and no current will flow through armature member 11 of dynamo-electric machine 10. The zero phase displacement positions of phase shifters 37 and 47 when the current output is zero are so chosen that substantially no restraint is placed upon the monocyclic network or expressed in another way the periods of conduction of the electric valves are such that they tend to produce a minimum phase displacement of the constant current from the normal 90° displacement with respect to the potential wave of the constant potential circuit. The gearing 54 is then connected so thereafter if phase shifter 37 is adjusted so as to advance the grid potentials of biphase rectifier 17, phase shifter 47 will simultaneously be adjusted so as to retard the grid potentials of biphase rectifier 18. On the other hand, if phase shifter 37 is adjusted so as to retard the grid excitation of biphase rectifier 17, phase shifter 47 will advance the grid excitation of biphase rectifier 18. If a curve is now plotted of the phase displacement of the phase shifters versus the current supplied to dynamo-electric machine 10 an ampere-phase displacement characteristic is obtained, similar to that shown in Fig. 2 which between points $a$ and $b$ is substantially linear. The positive or negative current values are limited to a definite maximum by the constant current system as is shown at points $a$ and $b$ on the curve I in Fig. 2. The initial adjustment of the phase shifters 37 and 47 will be made so that the apparatus operates without appreciable restraint on the monocyclic network. When the phase shifters 37 and 47 are adjusted so no output current is supplied to dynamo-electric machine 10, it will be observed that then each biphase rectifier will carry one-half of the current supplied by the constant current system which will circulate between the two rectifiers. The power drawn from the constant potential alternating supply circuit 14 will be substantially zero except for negligible losses in the rectifiers, and the current flow through the rectifiers will be a wattless circulating current. With this type of apparatus the power drawn from the constant potential alternating current circuit 14 will substantially correspond to the watts input to dynamo-electric machine 10. Since the primary winding 19 of transformer 16 is connected in a constant current circuit the apparatus, and especially the electric discharge valves are completely protected since even in case of short circuit the current will not exceed a definite maximum value. From the above description it is obvious that by merely adjusting phase shifter 37 phase shifter 47 is automatically adjusted and current of either polarity may be supplied to armature member 11 of dynamo-electric machine 10. Thus dynamo-electric machine 10 may be controlled by phase shifters 37 and 47 and caused to rotate in either direction at variable speed or to remain in standstill position. Furthermore, by means of the apparatus illustrated in Fig. 1 it is possible to distribute a fairly balanced load under most operating conditions upon the three-phase constant potential alternating current circuit 14.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the spirit and scope of my invention.

What I claim as new and desire to secure by Letters Patent of the United States, is:

1. In combination an alternating current circuit of constant potential, means energized from said alternating current circuit for transforming the constant potential alternating current to alternating current of constant value, a variable speed reversible dynamo-electric machine, a pair of electric valve means interposed between said first-mentioned means and said dynamo-electric machine for transmitting energy therebetween, said electric valve means being reversely connected with respect to said dynamo-electric machine and means for controlling the conductivities of said electric valve means simultaneously in opposite directions to cause said dynamo-electric machine to rotate in either direction at variable speed.

2. In combination, a polyphase alternating current circuit of constant potential, a network of reactances of opposite sign energized from said alternating current circuit for transforming constant potential polyphase alternating current to single phase alternating current of constant value, a dynamo-electric machine having an armature winding, electric valve means including a pair of cross-connected biphase rectifiers and control members therefor interposed between said network and said dynamo-electric machine for supplying direct current to said armature winding, and means for controlling the conductivity of said plurality of electric discharge valves so that direct current of either polarity and of variable magnitude may be supplied to said armature winding.

3. In combination, a polyphase alternating current circuit of constant potential, a network of reactances of opposite sign arranged to be energized from said alternating current circuit for transforming polyphase constant potential alternating current to single phase alternating current of constant value, a dynamo-electric machine, electric valve means interposed between said network and said dynamo-electric machine comprising a pair of cross-connected biphase rectifiers connected to supply direct current of either polarity to said dynamo-electric machine, and means for controlling the conductivities of said electric means to vary the magnitude of said direct current and thereby to control the operation of said dynamo-electric machine.

4. In combination, a polyphase alternating current circuit of constant potential, means energized from said alternating current circuit for transforming said constant potential polyphase alternating current to single phase alternating current of constant value, a dynamo-electric machine, a plurality of cross-connected biphase rectifiers interposed between said first-mentioned means and said dynamo-electric machine, a control circuit for each of said biphase rectifiers, and means for controlling the operation of said biphase rectifiers so that direct current of either potential and variable magntiude may be supplied to said dynamo-electric machine.

5. In combination, an alternating current circuit of constant potential, a network of reactances of opposite sign energized from said alternating current circuit for transforming constant potential alternating current to alternating current of constant value, a dynamo-electric machine having an armature winding, a plurality of electric valve means interposed between said network and said dynamo-electric machine, said valve means being oppositely connected with respect to said dynamo-electric machine to supply direct current of either polarity to said armature winding, and means for controlling the conductivity of said electric valve means to vary the magnitude of said direct current to control the operation of said dynamo-electric machine.

6. In combination, a polyphase alternating current circuit of constant potential, a network of reactances of opposite sign energized from said alternating current circuit for transforming constant potential polyphase alternating current to single phase alternating current of constant value, a dynamo-electric machine having an armature winding, electric valve means interposed between said network and said dynamo-electric machine for supplying variable direct current of either polarity to said dynamo-electric machine, and means for controlling said electric valve means to control the operation of said dynamo-electric machine.

7. In combination, an alternating current circuit of constant potential, means energized from said alternating current circuit for transforming the constant potential alternating current to alternating current of constant value, a direct current circuit, electric valve means interposed between said first-mentioned means and said direct current circuit for transmitting energy therebetween and including separately controllable discharge paths, and means for controlling conjointly the conductivities of said discharge paths of said electric valve means to cause the current in said direct current circuit to assume various values within a range between a given positive and a given negative value, said last-mentioned means being so adjusted as to cause substantially no restraint on said first-mentioned means.

8. In combination, an alternating current circuit of constant potential, means separated from alternating current circuit for transforming said constant potential alternating current to alternating current of constant value, a direct current circuit, a plurality of cross-connected biphase rectifiers interposed between said first-mentioned means and said direct current circuit, a control circuit for each of said biphase rectifiers, and means for controlling the operation of said biphase rectifiers to cause the current in said direct current circuit to assume various values within a range between a given positive and a given negative value.

CLODIUS H. WILLIS.

CERTIFICATE OF CORRECTION.

Patent No. 2,276,752.  March 17, 1942.

CLODIUS H. WILLIS

It is hereby certified that error appears in the printed specification of the above numbered patent requiring correction as follows: Page 4, second column, line 18, claim 8, for "separated from" read --energized from said--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.